United States Patent
Ro et al.

(10) Patent No.: US 7,005,173 B2
(45) Date of Patent: Feb. 28, 2006

(54) OPTICAL DISK FOR MOBILE DEVICE

(75) Inventors: Myong-do Ro, Gyeonggi-do (KR); In-sik Park, Gyeonggi-do (KR); Sun-mo Kim, Seoul (KR); Chang-min Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/796,281

(22) Filed: Mar. 10, 2004

(65) Prior Publication Data

US 2004/0229005 A1    Nov. 18, 2004

(30) Foreign Application Priority Data

Mar. 19, 2003  (KR) .................... 10-2003-0017066
Jun. 9, 2003   (KR) .................... 10-2003-0036742

(51) Int. Cl.
*B32B 3/02*    (2006.01)

(52) U.S. Cl. ............... 428/64.1; 428/64.4; 430/270.11; 369/280

(58) Field of Classification Search ............... 428/64.1, 428/64.4, 913; 430/270.11; 369/280
See application file for complete search history.

(56) References Cited

U.S. PATENT DOCUMENTS

2002/0197441 A1 * 12/2002 Hariharan et al. ......... 428/65.1
2003/0152018 A1 *  8/2003 Medower et al. ........... 369/272
2003/0157292 A1 *  8/2003 Medower et al. .......... 428/64.4
2004/0151868 A1 *  8/2004 Kim et al. ................. 428/65.1

* cited by examiner

*Primary Examiner*—Elizabeth Mulvaney
(74) *Attorney, Agent, or Firm*—Stein, McEwen & Bui, LLP (57) ABSTRACT

An optical disk for a mobile device is provided. The optical disk includes a substrate, having an outer diameter less than 120 mm and not smaller than 30 mm and a thickness less than 1.1 mm and not smaller than 0.40 mm, so that a deflection angle of 0.7° or smaller can be obtained. Alternatively, the optical disk includes a substrate, having an outer diameter not smaller than 30 mm and a thickness not smaller than 0.435 mm, so that a deflection angle of 0.6° or smaller is obtained.

19 Claims, 7 Drawing Sheets

OPTICAL DISK FOR MOBILE DEVICE

CROSS-REFERENCE TO RELATED APPLICATIONS

This application claims the benefit of Korean Patent Application Nos. 2003-17066 filed on Mar. 19, 2003 and 2003-36742 filed on Jun. 9, 2003, in the Korean Intellectual Property Office, the disclosure of which is incorporated herein by reference.

BACKGROUND OF THE INVENTION

1. Field of the Invention

The present invention relates to an optical disk, and more particularly, to an optical disk for a mobile device, which is less likely to be deflected.

2. Description of the Related Art

Recently, mobile devices using a small-sized recording medium, such as digital still cameras, portable music players, and personal digital assistants (PDAs), have come into wide use. Small-sized memory cards can be used for such mobile devices, but their relatively high price makes them less attractive to customers than their cheaper counterparts, such as CD-R/RW disks. General apparatuses for recording data on and reproducing data from a CD or DVD, however, are relatively big to be carried, and thus it is necessary to develop a small-sized mobile device for recording data on or reproducing data from a CD or DVD and a disk having a new format appropriate for such a small-sized mobile device.

A conventional high-density optical disk is manufactured by recording data on a substrate having a thickness of 1.1 mm and depositing an optical transmission layer on the top surface of the substrate to a thickness of 0.1 mm using a spin coating or sheet bonding technique.

Figure 1A:
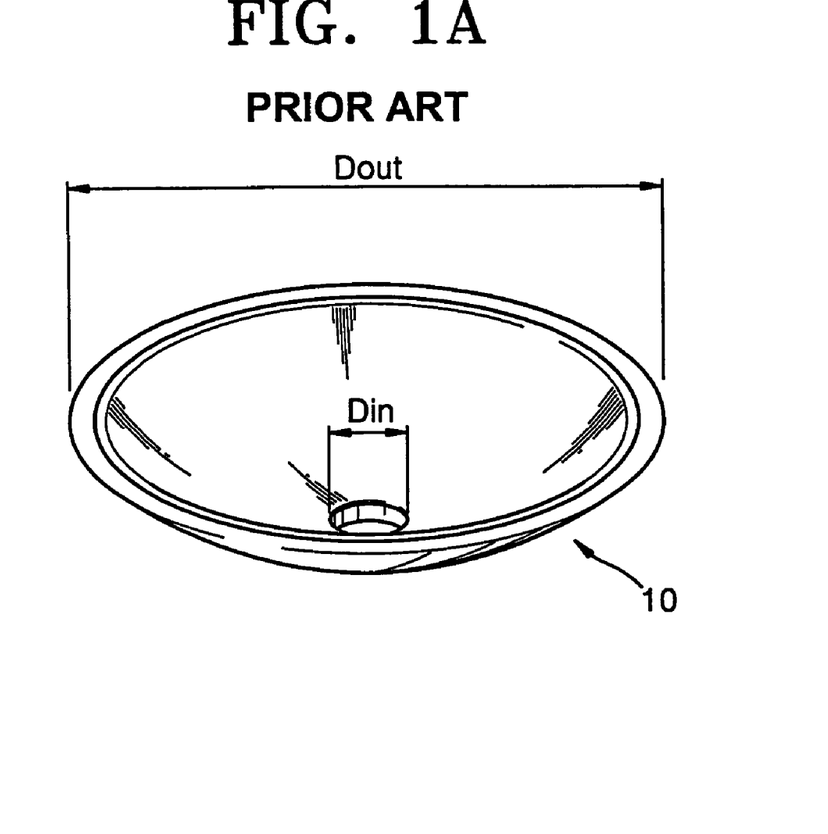
FIG. 1A is a perspective view of a conventional optical disk.
Figure 1B:
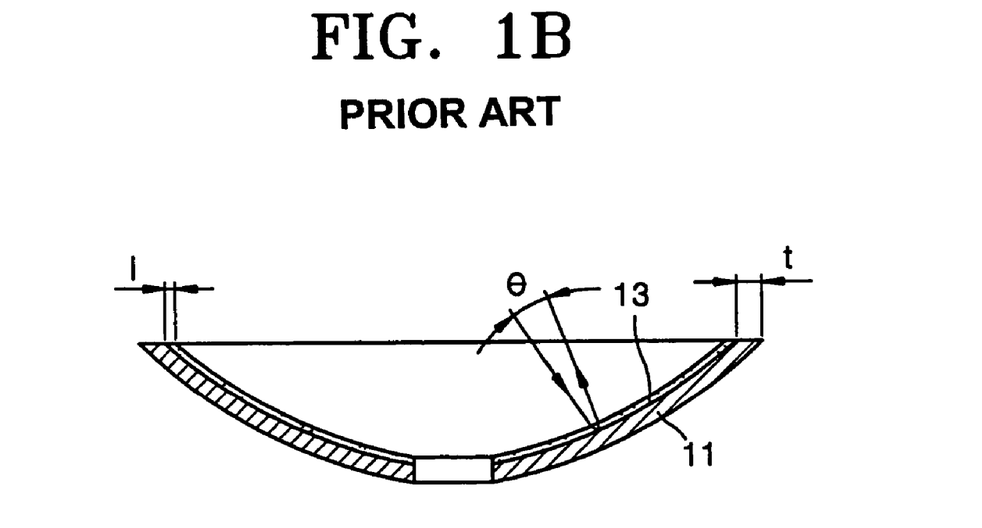
FIG. 1B is a cross-sectional view of the optical disk shown in FIG. 1A.

FIGS. 1A and 1B are a perspective view and a cross-sectional view, respectively, of a conventional optical disk 10 bent due to a process of forming an optical transmission layer. Referring to FIGS. 1A and 1B, an optical disk 10 has an outer diameter Dout of 120 mm, an inner diameter Din of 15 mm, and a thickness t of 1.1 mm. An optical transmission layer 13 formed on the surface of a substrate 11 has a thickness I of 0.1 mm. In FIG. 1B, light perpendicularly incident to the optical transmission layer 13 is refracted after passing through the optical transmission layer 13 and reflected from an interface between the optical transmission layer 13 and the substrate 11, and then exits from the optical disk 10. As shown in FIG. 1B, the exiting light forms a predetermined angle θ (referred to as deflection angle) with the entering light. The conventional optical disk 10 has a deflection angle of 0.2° and is affected by a contractile-force-per-meter of 27 N/m.

As described above with reference to FIGS. 1A and 1B, even though an optical disk having a thickness of 1.1 mm is bent due to a process of forming an optical transmission layer, it is possible to normally drive the optical disk using a general apparatus for recording data on or reproducing data from an optical disk as long as a deflection angle of the optical disk does not exceed a standardized limit for deflection angle, which is 0.7°. However, in order to manufacture an optical disk for a mobile device, a thin substrate having a thickness of 1.1 mm or below is necessary. Since a thinner substrate is more vulnerable to a contractile force generated during the plasticization of an optical transmission layer deposited on the surface of the substrate, the substrate may be bent more severely and provide a larger deflection angle than the substrate 10 shown in FIGS. 1A and 1B. If an optical disk has a deflection angle larger than predetermined degrees, it may be impossible to normally record data on or reproduce data from the optical disk.

SUMMARY OF THE INVENTION

The present invention provides an optical disk including a substrate having a predetermined outer diameter and thickness, by which the substrate can be prevented from being bent in a process of forming an optical transmission layer.

According to an aspect of the present invention, there is provided an optical disk including a substrate, having an outer diameter not smaller than 28 mm and a thickness not smaller than 0.29 mm, so that a deflection angle of 0.7° or smaller can be obtained.

According to an aspect of the present invention, when the outer diameter is 30 mm, the thickness is determined to be 0.30 mm or larger.

According to an aspect of the present invention, when the outer diameter is 32 mm, the thickness is determined to be 0.31 mm or larger.

According to an aspect of the present invention, when the outer diameter is 47 mm, the thickness is determined to be 0.375 mm or larger.

According to an aspect of the present invention, when the outer diameter is 50.8 mm, the thickness is determined to be 0.388 mm or larger.

According to an aspect of the present invention, when the outer diameter is 80 mm, the thickness is determined to be 0.501 mm or larger.

According to an aspect of the present invention, when the outer diameter is 120 mm, the thickness is determined to be 0.53 mm or larger.

According to another aspect of the present invention, there is provided an optical disk including a substrate, having an outer diameter not smaller than 28 mm and a thickness not smaller than 0.323 mm, so that a deflection angle of 0.6° or smaller can be obtained.

According to an aspect of the present invention, an optical transmission layer having a thickness of 0.03–0.1 mm is formed on the surface of the substrate. According to an aspect of the present invention, the optical transmission layer is formed of acrylate-based resin or polycarbonate.

According to another aspect of the present invention, there is provided an optical disk comprising a substrate, having a deflection angle y, a thickness x, and an outer diameter z. Here, the deflection angle y, the thickness x, the outer diameter z satisfy the following equation:

$$\alpha = 0.00396z^2 - 0.10096z + 4.15552$$

$$\beta = 0.00027z^2 - 0.05129z - 2.98393,$$

$$x \geq \frac{1}{\beta} \ln\left(\frac{1.1 \times y}{\alpha}\right)$$

In the above equation, α and β represent characteristic coefficients.

According to an aspect of the present invention, the deflection angle y is 0.6° or smaller.

According to an aspect of the present invention, the characteristic coefficients α and β are set to 4.6867 and −4.3083, respectively, when the outer diameter z is 30 mm.

According to an aspect of the present invention, the characteristic coefficients α and β are set to 4.9484 and −4.3162, respectively, when the outer diameter z is 32 mm.

According to an aspect of the present invention, the characteristic coefficients α and β are set to 8.9926 and −4.8605, respectively, when the outer diameter z is 50.8 mm.

According to an aspect of the present invention, the characteristic coefficients α and β are set to 21.446 and −5.3843, respectively, when the outer diameter z is 80 mm.

According to an aspect of the present invention, the characteristic coefficients α and β are obtained using the following equations for the thickness x and the deflection angle y:

$$\sum_{i=1}^{n} y_i \cdot \exp(\beta \cdot x_i) = \alpha \sum_{i=1}^{n} \exp(2\beta \cdot x_i)$$

$$\sum_{i=1}^{n} y_i \cdot \exp(\beta \cdot x_i) \sum_{i=1}^{n} x_i \cdot \exp(2\beta \cdot x_i) =$$

$$\sum_{i=1}^{n} \exp(2\beta \cdot x_i) \sum_{i=1}^{n} x_i \cdot y_i \cdot \exp(\beta \cdot x_i).$$

According to an aspect of the present invention, an optical transmission layer having a thickness of 0.03–0.1 mm is formed on the surface of the substrate. According to an aspect of the present invention, the optical transmission layer is formed of acrylate-based resin or polycarbonate.

According to another aspect of the present invention, there is provided an optical disk including a substrate, having an outer diameter not smaller than 30 mm and a thickness not smaller than 0.40 mm, so that a deflection angle of 0.7° or smaller can be obtained.

According to another aspect of the present invention, there is provided an optical disk including a substrate, having an outer diameter not smaller than 30 mm and a thickness not smaller than 0.435 mm, so that a deflection angle of 0.6° or smaller can be obtained.

In the present invention, it is possible to prevent a substrate from being bent in a process of forming an optical transmission layer of an optical disk by putting a limit on the diameter and thickness of the substrate.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the aspects of the present invention, examples of which are illustrated in the accompanying drawings, wherein like reference numerals refer to the like elements throughout. The aspects are described below to explain the present invention by referring to the figures.

Figure 2A:
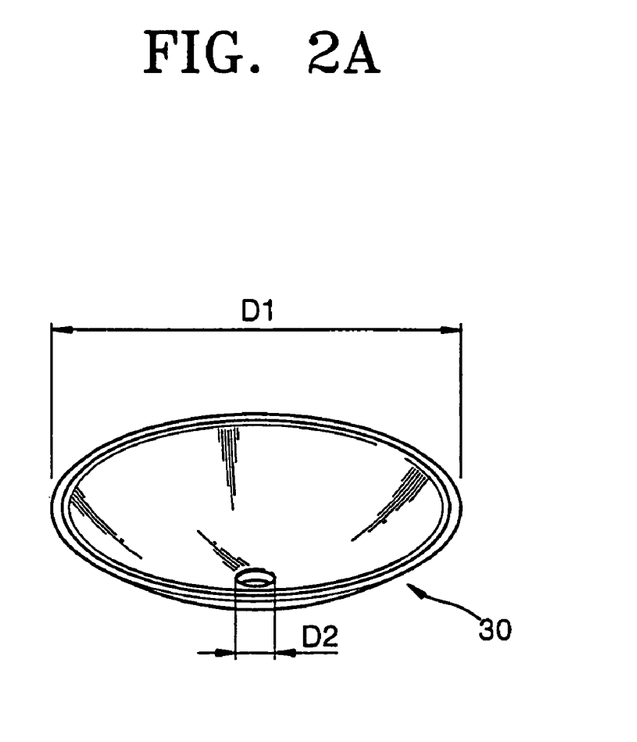
FIG. 2A is a perspective view of an optical disk according to an aspect of the present invention.
Figure 2B:
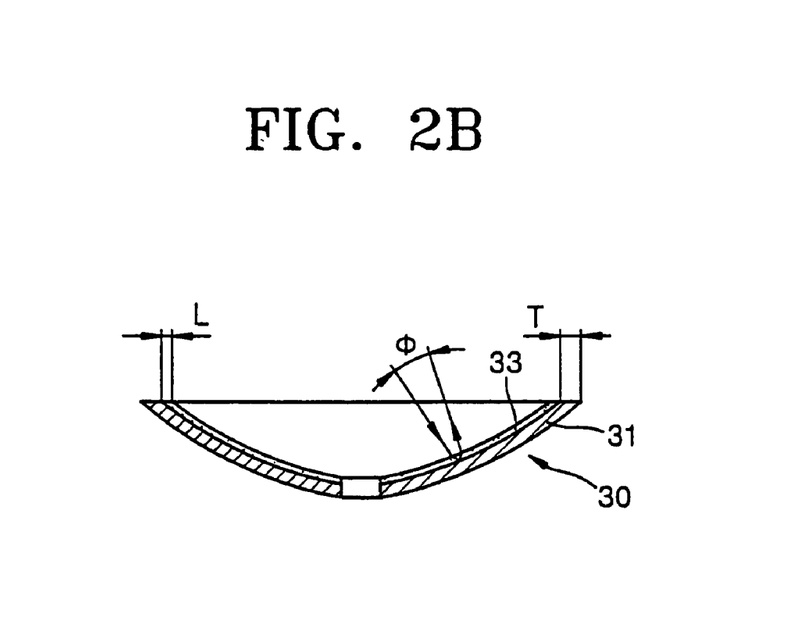
FIG. 2B is a cross-sectional view of the optical disk shown in FIG. 2A.

FIGS. 2A and 2B are a perspective view and a cross-sectional view, respectively, of an optical disk according to an aspect of the present invention. Referring to FIGS. 2A and 2B, an optical transmission layer 33 is formed on a substrate 31 to a thickness L of 0.03–0.1 mm. In order to obtain a deflection angle Φ of 0.7° or below, an optical disk 30 is manufactured so that its outer diameter D1 and thickness T can satisfy the following conditions.

When the diameter D1 is not smaller than 30 mm, the thickness T needs to be 0.3 mm or larger. For example, the optical disk 30 may have an outer diameter D1 of 32 mm and a thickness T of 0.31 mm. When the diameter D1 is about 47 mm, the thickness T needs to be 0.375 mm or larger. When the diameter D1 is about 50.8 mm, the thickness T needs to be 0.388 mm. When the diameter D1 is about 80 mm, the thickness T needs to be 0.501 mm or larger. When the diameter D1 is about 120 mm, the thickness T needs to be 0.53 mm or larger.

Based on the fact that a contractile force of 27 N/m acts on an optical disk including a substrate, having an outer diameter of 120 mm, an inner diameter of 15 mm, a thickness of 0.5 mm, and an optical transmission layer, having a thickness of 0.1 mm, the optical disk 30 of an aspect of the present invention is manufactured to include the substrate 31 having an outer diameter D1 of 50.8 mm, an inner diameter D2 of 5 mm, and a thickness of 0.5 mm.

Thereafter, the contractile force-per-meter acting on the substrate 31 during the formation of the optical transmission layer 33 having a thickness L of 0.03 mm, 0.05 mm, or 0.1 mm is calculated.

Table 1 shows the variation of a deflection angle Φ with respect to the thickness L of the optical transmission layer 33 formed on the substrate 31 having an outer diameter D1 of 50.8 mm, an inner diameter D2 of 5 mm, and a thickness T of 0.5 mm. In Table 1, the thickness L of the optical transmission layer 33 varies from 0.1 mm to 0.05 mm and from 0.05 mm to 0.03 mm.

TABLE 1

| Thickness of optical transmission layer (mm) | Contractile force (N/m) | Deflection angle (°) |
|---|---|---|
| 0.1 | 104.1 | 0.38 |
| 0.05 | 52.1 | 0.19 |
| 0.03 | 31.2 | 0.11 |

As shown in Table 1, when the optical transmission layer 33 has a thickness L of 0.1 mm and the thickness T of the substrate 31 is 0.5 mm, the deflection angle of the optical disk 30 is 0.38°, which is 0.18° larger than that of a conventional optical disk. However, when the thickness L of the optical transmission layer 33 decreases from 0.1 mm to 0.05 mm and from 0.05 mm to 0.03 mm, the deflection angle decreases from 0.38° to 0.19° and from 0.19° to 0.11°, respectively.

The optical transmission layer 33 is formed by coating the surface of the substrate 31 with acrylate-based resin or a polycarbonate (PC) film using a spin coating or sheet bonding technique. However, the optical transmission layer 33 needs to be formed to have a thickness of 0.03–0.1 mm so that the optical disk 30 can be prevented from being bent.

For example, the substrate 31 is manufactured under the following injection molding conditions: the temperature of a metal mold is 125° C. at a fixed side and 128° C. at a moving side, the temperature of resin is about 340° C., a holding force of 35 ton and a clamping pressure of 50 kgf are used, and mold cooling time is set to 5 seconds. In addition, the optical transmission layer 33 is formed using resin having a viscosity of about 5,000 by rotating a spin coating apparatus at a speed of 3,000 rpm for 30 seconds.

Figure 3:
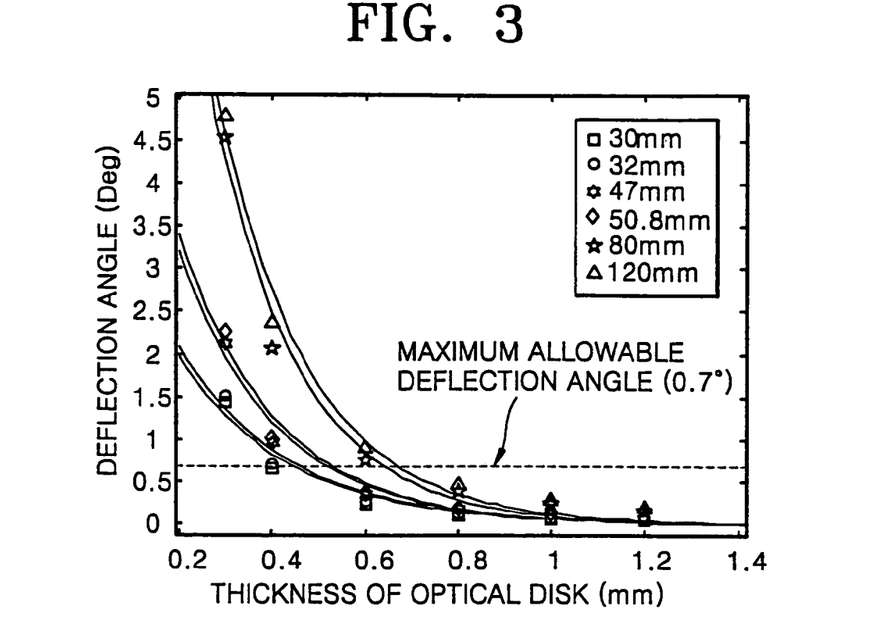
FIG. 3 is a graph showing the variation of a deflection angle with respect to the outer diameter and thickness of an optical disk.

FIG. 3 is a graph showing the results of simulations for the variation of a deflection angle with respect to the outer diameter and thickness of an optical disk formed under the above-described injection molding conditions. In the simulations, the outer diameter of an optical disk gradually varies from 30 mm (inner diameter: 4 mm) to 32 mm (inner diameter: 4 mm), from 32 mm to 47 (inner diameter: 5 mm), from 47 mm to 50.8 mm (inner diameter: 5 mm), from 50.8 mm to 80 mm (inner diameter: 15 mm), and from 80 mm to 120 mm (the inner diameter: 15 mm), the thickness of the optical disk is fixed at 0.1 mm, and the thickness of a substrate gradually varies from 0.2 mm to 0.3 mm, from 0.3 mm to 0.5 mm, from 0.5 mm to 0.7 mm, from 0.7 mm to 0.9 mm, and from 0.9 mm to 1.1 mm. Here, an optical transmission layer is set to have a thickness of 0.1 mm. Referring to FIG. 3, as the outer diameter of the optical disk increases and the thickness of the optical disk decreases, a deflection angle increases. Curve fitting is performed by applying a least square method to data points shown in FIG. 3 and makes it possible to consecutively calculate the deflection angle of an optical disk with the thickness of the optical disk varying from 0.2 mm to 1.4 mm, as shown in FIG. 3.

The least square method is performed in the following way. First, a fitting curve is deduced from the data points shown in FIG. 3, which is shown in Equation (1) below.

$$y_i = \alpha \cdot \exp(\beta \cdot x_i) \tag{1}$$

In Equation (1), $x_i$ represents the thickness of an optical disk, and $y_i$ represents the calculated deflection angle of the optical disk. α and β are characteristic coefficients. The characteristic coefficients α and β, which can minimize a summation square error (SSE) between a measured deflection angle $Y_i$ of the optical disk and the deflection angle $y_i$ obtained using Equation (1), are obtained using Equation (2).

$$SSE = \sum_{i=1}^{n} (Y_i - y_i)^2 \tag{2}$$

Equations (3) and (4) are obtained by partially differentiating Equation (2) with respect to the characteristic coefficients α and β and rearranging the result of the partial differentiation while making the left side of the resulting equation equal to 0.

$$\sum_{i=1}^{n} y_i \cdot \exp(\beta \cdot x_i) = \alpha \sum_{i=1}^{n} \exp(2\beta \cdot x_i) \tag{3}$$

$$\sum_{i=1}^{n} y_i \cdot \exp(\beta \cdot x_i) \sum_{i=1}^{n} x_i \cdot \exp(2\beta \cdot x_i) = \sum_{i=1}^{n} \exp(2\beta \cdot x_i) \sum_{i=1}^{n} x_i \cdot y_i \cdot \exp(\beta \cdot x_i). \tag{4}$$

The characteristic coefficients α and β vary depending on the outer diameter of an optical disk having different characteristic coefficient values. Various characteristic coefficient values obtained for different outer diameter values by using Equations (3) and (4) are shown in Table 2 below.

TABLE 2

| Outer diameter of optical disk (mm) | α | β |
|---|---|---|
| 30 | 4.6867 | −4.3083 |
| 32 | 4.9484 | −4.3162 |
| 47 | 8.4470 | −4.8578 |
| 50.8 | 8.9926 | −4.8605 |
| 80 | 21.446 | −5.3843 |
| 120 | 21.105 | −5.1142 |

FIGS. 4 through 7 are graphs showing the results of curve fitting using data points obtained through various simulations. In FIGS. 4 through 7, a maximum allowable deflection angle is set to 0.7°, and the limit of error for the results of curve fitting is ±20%.

Figure 4:
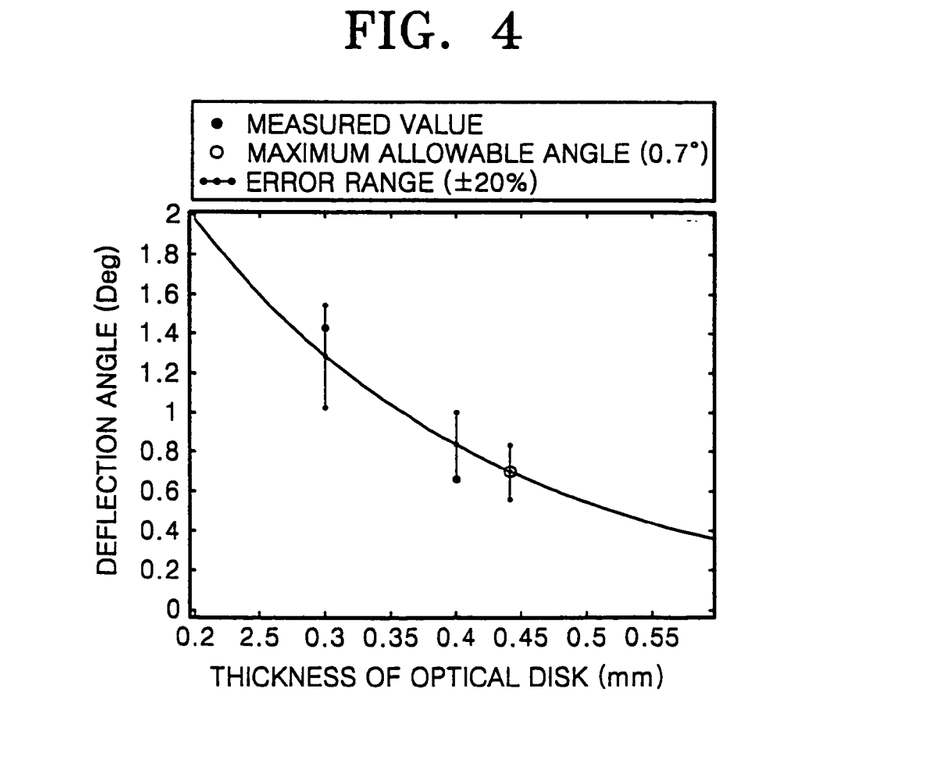
FIG. 4 is a graph showing the variation of a deflection angle with respect to the thickness of an optical disk having an outer diameter of 30 mm according to an aspect of the present invention.

In particular, FIG. 4 is a graph showing the variation of a deflection angle with respect to the thickness of an optical disk when the outer diameter of the optical disk is 30 mm and the characteristic coefficients α and β have values of 4.6867 and −4.3083, respectively. In FIG. 4, different deflection angles depending on the thickness of an optical disk having an outer diameter of 30 mm are obtained using the following equation.

$$x \geq \frac{1}{\beta} \ln\left(\frac{1.2 \times y}{\alpha}\right) \quad (5)$$

Deflection angles $y_i$ of optical disks having an outer diameter of 30 mm but different thickness values $x_i$, for example, 0.3 mm and 0.4 mm, are obtained using Equation (1) and are marked in FIG. 4 with their corresponding maximum and minimum allowable deflection angles within ±20% error ranges. As shown in FIG. 4, if a standardized deflection angle is set to 0.7°, the thickness $x_i$ of the optical disk having an outer diameter of 30 mm needs to be 0.40 mm or larger in order to obtain a deflection angle not larger than 0.7°, and the thickness of a substrate is preferably 0.3 mm or larger.

Figure 5:
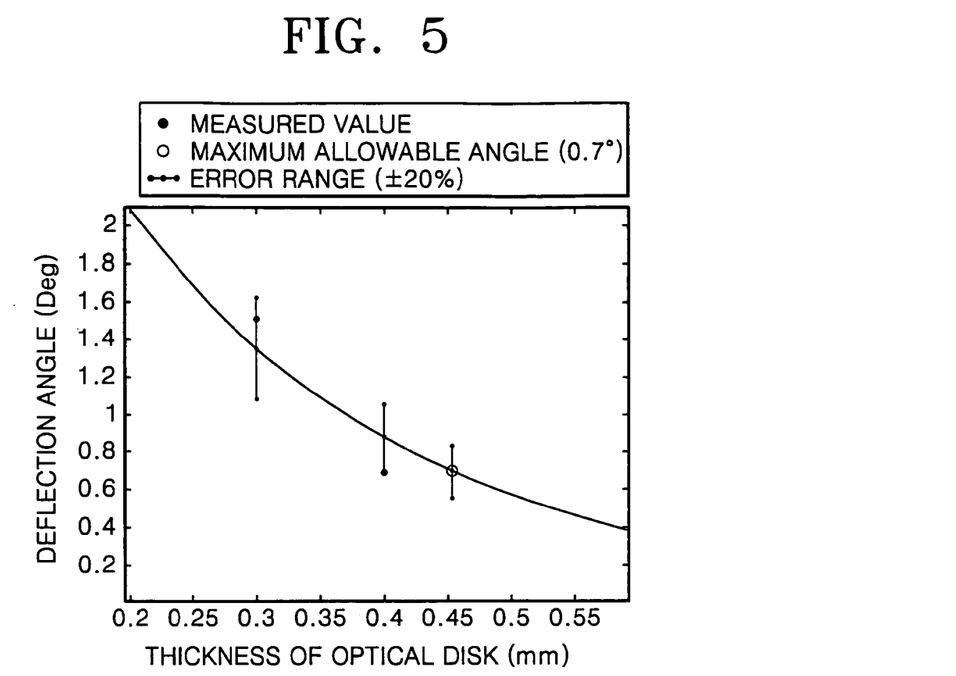
FIG. 5 is a graph showing the variation of a deflection angle with respect to the thickness of an optical disk having an outer diameter of 32 mm according to an aspect of the present invention.

FIG. 5 is a graph showing the variation of a deflection angle with respect to the thickness of an optical disk when the outer diameter of the optical disk is 32 mm and the characteristic coefficients $\alpha$ and $\beta$ have values of 4.9484 and −4.3162, respectively.

Deflection angles $y_i$ of optical disks having an outer diameter of 30 mm but different thickness values $x_i$, for example, 0.3 mm, 0.4 mm, and 0.45 mm, are obtained using Equation (5) and are marked in FIG. 5 with their corresponding maximum and minimum allowable deflection angles within ±20% error ranges. As shown in FIG. 4, if a standardized deflection angle is set to 0.7°, the thickness $x_i$ of the optical disk having an outer diameter of 32 mm needs to be 0.41 mm or larger in order to obtain a deflection angle not larger than 0.7°, and the thickness of a substrate is preferably 0.31 mm or larger.

Referring to FIG. 5, the result of measuring an optical disk having a thickness T of 0.4 mm shows that the optical disk has a deflection angle of 0.67°. In addition, the result of measuring an optical disk having a thickness of 0.6 mm shows that the optical disk has a deflection angle of about 0.7°. These measurement results provide a sound piece of proof that the simulation results shown in FIG. 5 are meaningful.

Figure 6:
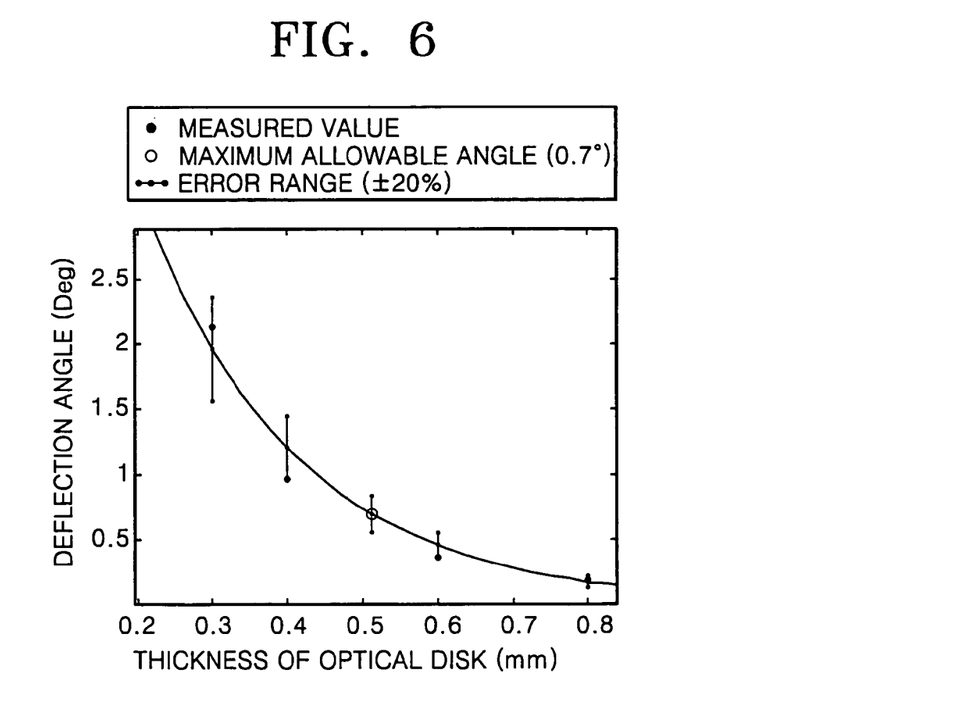
FIG. 6 is a graph showing the variation of a deflection angle with respect to the thickness of an optical disk having an outer diameter of 47 mm according to an aspect of the present invention.

FIG. 6 is a graph showing the variation of a deflection angle with respect to the thickness of an optical disk when the outer diameter of the optical disk is 47 mm and the characteristic coefficients $\alpha$ and $\beta$ have values of 8.9926 and −21.446, respectively.

Deflection angles $y_i$ of optical disks having an outer diameter of 47 mm but different thickness values $x_i$, for example, 0.3 mm, 0.4 mm, and 0.515 mm, are obtained using Equation (5) and are marked in FIG. 6 with their corresponding maximum and minimum allowable deflection angles within ±20% error ranges. As shown in FIG. 6, if a standardized deflection angle is set to 0.7°, the thickness $x_i$ of the optical disk having an outer diameter of 47 mm needs to be 0.475 mm or larger in order to obtain a deflection angle not larger than 0.7°, and the thickness of a substrate is preferably 0.375 mm or larger.

Referring to FIG. 6, the result of measuring an optical disk having a thickness T of 0.4 mm shows that the optical disk has a deflection angle of 0.64°. In addition, the result of measuring an optical disk having a thickness of 0.515 mm shows that the optical disk has a deflection angle of about 0.7°.

Figure 7:
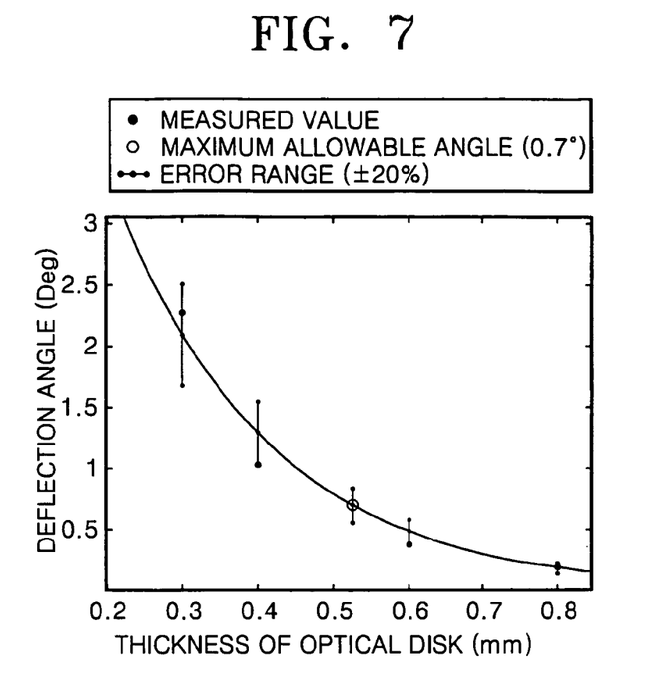
FIG. 7 is a graph showing the variation of a deflection angle with respect to the thickness of an optical disk having an outer diameter of 50.8 mm according to an aspect of the present invention.

FIG. 7 is a graph showing the variation of a deflection angle with respect to the thickness of an optical disk when the outer diameter of the optical disk is 47 mm and the characteristic coefficients $\alpha$ and $\beta$ have values of 8.9926 and −21.446, respectively. Deflection angles $y_i$ of optical disks having an outer diameter of 47 mm but different thickness values $x_i$ are obtained using Equation (5). In order to prevent a maximum allowable deflection angle from exceeding 0.7°, the thickness $x_i$ of the optical disk needs to be 0.488 mm or larger, and the thickness of a substrate is preferably 0.388 mm or larger.

Referring to FIG. 7, the result of measuring an optical disk having a thickness T of 0.525 mm shows that the optical disk has a deflection angle of 0.64°. In addition, the result of measuring an optical disk having a thickness of 0.6 mm shows that the optical disk has a deflection angle of about 0.48°.

Figure 8:
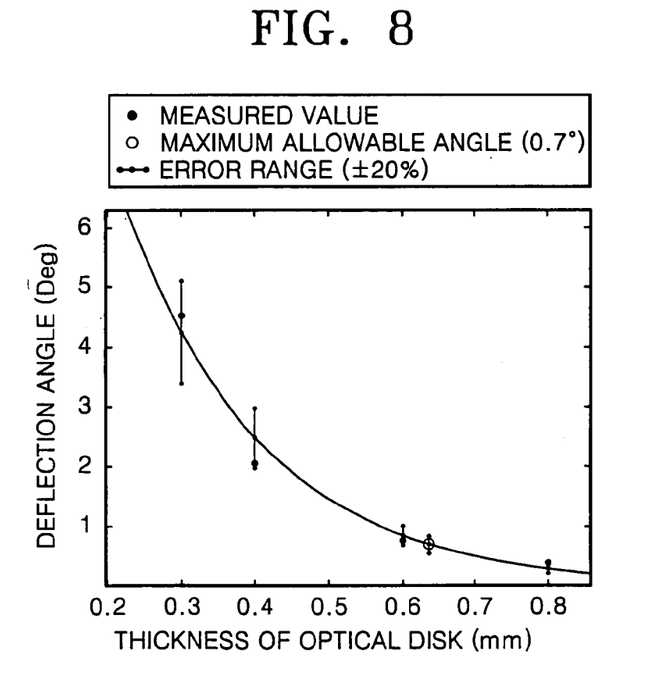
FIG. 8 is a graph showing the variation of a deflection angle with respect to the thickness of an optical disk having an outer diameter of 80 mm according to an aspect of the present invention.

FIG. 8 is a graph showing the variation of a deflection angle with respect to the thickness of an optical disk when the outer diameter of the optical disk is 80 mm and the characteristic coefficients $\alpha$ and $\beta$ have values of 21.446 and −5.3843, respectively. Deflection angles $y_i$ of optical disks having an outer diameter of 80 mm but different thickness values $x_i$ are obtained using Equation (5). In order to prevent a maximum allowable deflection angle from exceeding 0.7°, the thickness $x_i$ of the optical disk needs to be 0.601 mm or larger, and the thickness of a substrate is preferably 0.501 mm or larger.

Referring to FIG. 8, the result of measuring an optical disk having a thickness T of 0.6 mm shows that the optical disk has a deflection angle of 0.85°. In addition, the result of measuring an optical disk having a thickness of 0.635 mm shows that the optical disk has a deflection angle of about 0.7°.

Figure 9:
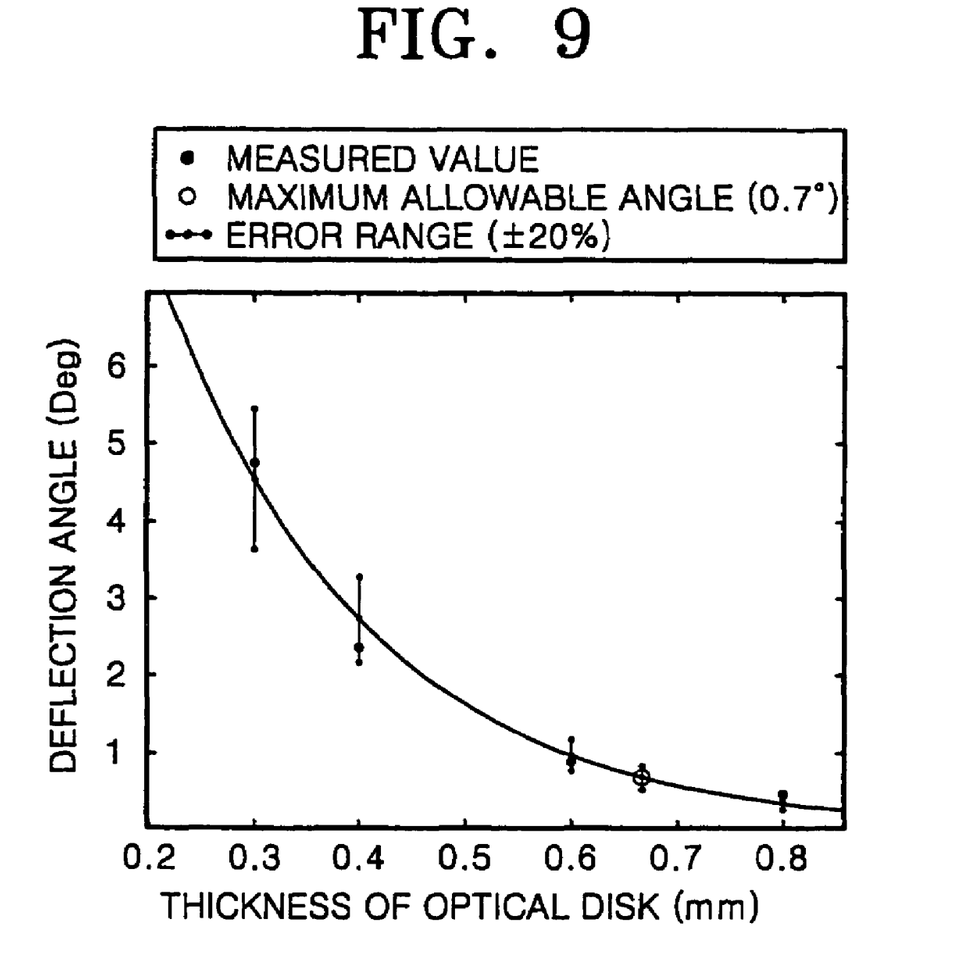
FIG. 9 is a graph showing the variation of a deflection angle with respect to the thickness of an optical disk having an outer diameter of 120 mm according to an aspect of the present invention.

FIG. 9 is a graph showing the variation of a deflection angle with respect to the thickness of an optical disk when the outer diameter of the optical disk is 120 mm and the characteristic coefficients $\alpha$ and $\beta$ have values of 21.105 and −5.1142, respectively. Deflection angles $y_i$ of optical disks having an outer diameter of 120 mm but different thickness values $x_i$ are obtained using Equation (5). In order to prevent a maximum allowable deflection angle from exceeding 0.7°, the thickness $x_i$ of the optical disk needs to be 0.63 mm or larger, and the thickness of a substrate is preferably 0.53 mm or larger.

Referring to FIG. 9, the result of measuring an optical disk having a thickness T of 0.6 mm shows that the optical disk has a deflection angle of 1°. In addition, the result of measuring an optical disk having a thickness of 0.67 mm shows that the optical disk has a deflection angle of about 0.7°.

The above-mentioned simulation results, shown in FIGS. 4 through 9, show that the thickness of an optical disk can be controlled so as not to exceed a maximum allowable deflection angle of 0.7° and the deflection angle of the optical disk can be obtained using Equation (1) irrespective of the type of the optical disk, taking into consideration that the deflection angle of the optical disk can vary within ±20% of a curve fitting result. In addition, it is possible to obtain a desired thickness $x_i$ of an optical disk with a given maximum allowable deflection angle using the characteristic coefficients $\alpha$ and $\beta$ and Equation (1).

In other words, when the outer diameter of the optical disk is 30 mm, 47 mm, 50.8 mm, 80 mm, or 120 mm under a condition that the maximum allowable deflection angle of an optical disk is set to 0.6°, the thickness of the optical disk is preferably not smaller than 0.435 mm, 0.447 mm, 0.5 mm, 0.52 mm, 0.63 mm, or 0.66 mm, respectively, which is shown in the following table.

TABLE 3

| Deflection angle | Diameter | | | | | |
|---|---|---|---|---|---|---|
| | 30 mm | 32 mm | 47 mm | 50.8 mm | 80 mm | 120 mm |
| ≧0.6° | ≦0.43 mm | ≦0.447 mm | ≦0.5 mm | ≦0.52 mm | ≦0.63 mm | ≦0.66 mm |
| ≧0.7° | ≦0.40 mm | ≦0.41 mm | ≦0.475 mm | ≦0.48 mm | ≦0.601 mm | ≦0.63 mm |

Figure 10:
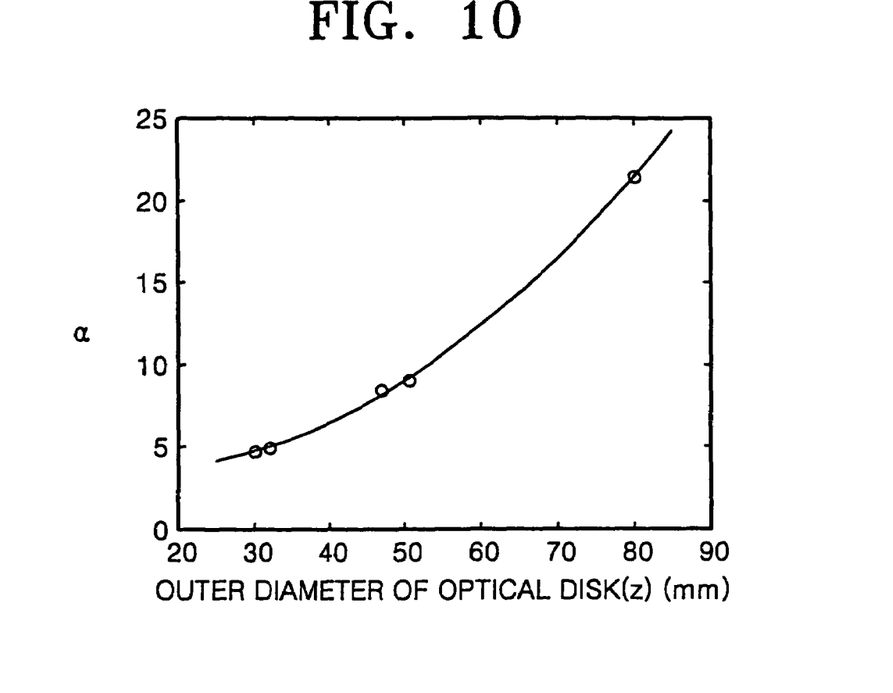
FIG. 10 is a graph showing the variation of a characteristic coefficient α with respect to the outer diameter z of an optical disk according to an aspect of the present invention.
Figure 11:
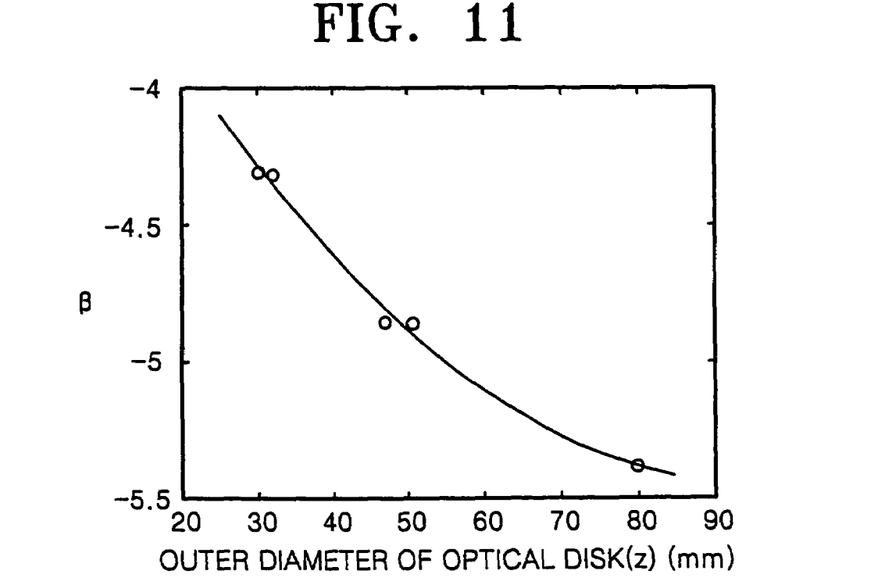
FIG. 11 is a graph showing the variation of a characteristic coefficient β with respect to the outer diameter z of an optical disk according to an aspect of the present invention.

In addition, the variation of the characteristic coefficients α and β with respect to the outer diameter z of an optical disk can be subjected to curve fitting. FIG. 10 is a graph showing the variation of the characteristic coefficient α with respect to the outer diameter z of an optical disk, and FIG. 11 is a graph showing the variation of the characteristic coefficient β with respect to the outer diameter z of an optical disk. The characteristic coefficient α is obtained using Equation (6) below, and the characteristic coefficient β is obtained using Equation (7) below. Therefore, once the outer diameter z of an optical diameter is given, the characteristic coefficients α and β can be obtained through a fitting equation. After all, the thickness of an optical disk having a desired deflection angle can be obtained by substituting the characteristic coefficients α and β into Equation (5).

$$\alpha = 0.00396 z^2 - 0.10096 z + 4.1552 \quad (6)$$

$$\beta = 0.00027 z^2 - 0.05129 z - 2.98393 \quad (7)$$

As described above, the larger the outer diameter of an optical disk, the larger the deflection angle of the optical disk. In addition, the smaller the thickness of the optical disk, the larger the deflection angle of the optical disk. Therefore, possible matches between the outer diameter and thickness of an optical disk under a condition that the deflection angle of the optical disk is 0.7° or 0.6° are shown in Table 3. Since the thickness of an optical transmission layer is supposedly set to 0.1 mm, as described above, possible substrate thicknesses (=the thickness of the optical disk−the thickness of the optical transmission layer) for different substrate outer diameters (=the outer diameter of the optical disk) are shown in FIG. 4.

TABLE 4

| Deflection angle | Diameter | | | | | |
|---|---|---|---|---|---|---|
| | 30 mm | 32 mm | 47 mm | 50.8 mm | 80 mm | 120 mm |
| ≧0.6° | ≦0.33 mm | ≦0.347 mm | ≦0.40 mm | ≦0.42 mm | ≦0.53 mm | ≦0.56 mm |
| ≧0.7° | ≦0.30 mm | ≦0.31 mm | ≦.375 mm | ≦0.38 mm | ≦.501 mm | ≦0.53 mm |

As described above, according to the present invention, it is possible to obtain an appropriate thickness of an optical disk with a given outer diameter of the optical disk when a deflection angle of the optical disk is set to a predetermined standardized limit, and thus it is possible to minimize the probability of a substrate of the optical disk from being bent.

The mobile optical disk of the present invention can be used as an optical recording medium for a mobile apparatus for recording data on or reading data from an optical recording medium. Especially, the mobile optical disk of the present invention can be loaded into such a mobile device using a compact-sized recording medium as a digital still camera (so called a digital camera), a portable music player, or a personal digital assistant (PDA).

Although a few aspects of the present invention have been shown and described, it would be appreciated by those skilled in the art that changes may be made in this aspect without departing from the principles and spirit of the invention, the scope of which is defined in the claims and their equivalents.

What is claimed is:

1. An optical disk comprising a substrate, having an outer diameter less than 120 mm and not smaller than 28 mm and a thickness less than 1.1 mm and not smaller than 0.29 mm, so that a deflection angle of 0.7° or smaller is obtained, wherein an optical transmission layer having a thickness of 0.03–0.1 mm is formed on a surface of the substrate.

2. The optical disk of claim 1, wherein when the outer diameter is 30 mm, the thickness is determined to be 0.30 mm or larger.

3. The optical disk of claim 1, wherein when the outer diameter is 32 mm, the thickness is determined to be 0.31 mm or larger.

4. The optical disk of claim 1, wherein when the outer diameter is 47 mm, the thickness is determined to be 0.375 mm or larger.

5. The optical disk of claim 1, wherein when the outer diameter is 50.8 mm, the thickness is determined to be 0.388 mm or larger.

6. The optical disk of claim 1, wherein when the outer diameter is 80 mm, the thickness is determined to be 0.501 mm or larger.

7. The optical disk of claim 1, wherein when the outer diameter is 120 mm, the thickness is determined to be 0.53 mm or larger.

8. The optical disk according to claim 1, having an outer diameter not smaller than 28 mm and a thickness not smaller than 0.323 mm, so that a deflection angle of 0.6° or smaller is obtained.

9. An optical disk comprising a substrate, having a deflection angle y, a thickness x, and an outer diameter z, the deflection angle y, the thickness x, the outer diameter z satisfying the following inequality:

$\alpha = 0.00396 z^2 - 0.10096 z + 4.15552$ $\beta = 0.00027 z^2 - 0.05129 z - 2.98393$, $$x \geq \frac{1}{\beta} \ln\left(\frac{1.1 \times y}{\alpha}\right)$$

wherein $\alpha$ and $\beta$ represent characteristic coefficients.

10. The optical disk of claim 9, wherein the deflection angle y is 0.6° or smaller.

11. The optical disk of claim 10, wherein the characteristic coefficients $\alpha$ and $\beta$ are set to 4.6867 and −4.3083, respectively, when the outer diameter z is 30 mm.

12. The optical disk of claim 10, wherein the characteristic coefficients $\alpha$ and $\beta$ set to 4.9484 and −4.3162, respectively, when the outer diameter z is 32 mm.

13. The optical disk of claim 10, wherein the characteristic coefficients $\alpha$ and $\beta$ are set to 8.9926 and −4.8605, respectively, when the outer diameter z is 50.8 mm.

14. The optical disk of claim 10, wherein the characteristic coefficients $\alpha$ and $\beta$ are set to 21.446 and −5.3843, respectively, when the outer diameter z is 80 mm.

15. The optical disk of claim 9, wherein the characteristic coefficients $\alpha$ and $\beta$ are obtained using the following equations for the thickness x and the deflection angle y:

$$\sum_{i=1}^{n} y_i \cdot \exp(\beta \cdot x_i) = \alpha \sum_{i=1}^{n} \exp(2\beta \cdot x_i)$$

$$\sum_{i=1}^{n} y_i \cdot \exp(\beta \cdot x_i) \sum_{i=1}^{n} x_i \cdot \exp(2\beta \cdot x_i) = \sum_{i=1}^{n} \exp(2\beta \cdot x_i) \sum_{i=1}^{n} x_i \cdot y_i \cdot \exp(\beta \cdot x_i).$$

16. The optical disk of claim 9, wherein an optical transmission layer having a thickness of 0.03–0.1 mm is formed on the surface of the substrate.

17. The optical disk of claim 9, wherein the optical transmission layer is formed of acrylate-based resin or polycarbonate.

18. The optical disk according to claim 1, having an outer diameter not smaller than 30 mm and a thickness not smaller than 0.40 mm, so that a deflection angle of 0.7° or smaller is obtained.

19. The optical disk according to claim 1, having an outer diameter not smaller than 30 mm and a thickness not smaller than 0.435 mm, so that a deflection angle of 0.6° or smaller is obtained.

* * * * *